(12) United States Patent
Friesen et al.

(10) Patent No.: US 7,941,560 B1
(45) Date of Patent: May 10, 2011

(54) CLIENT CACHING OF TARGET ADDRESSES FOR NETWORK REQUESTS

(75) Inventors: Leslie V. Friesen, Calgary (CA); Andrew J. Little, Calgary (CA)

(73) Assignee: Intuit Inc., Mountain View, CA (US)

( * ) Notice: Subject to any disclaimer, the term of this patent is extended or adjusted under 35 U.S.C. 154(b) by 651 days.

(21) Appl. No.: 11/487,239

(22) Filed: Jul. 14, 2006

(51) Int. Cl.
*G06F 15/16* (2006.01)

(52) U.S. Cl. ......... 709/245; 709/224; 715/206; 715/229

(58) Field of Classification Search ............... 709/245, 709/224; 715/206, 229
See application file for complete search history.

(56) References Cited

U.S. PATENT DOCUMENTS

| | | | |
|---|---|---|---|
| 5,754,774 A * | 5/1998 | Bittinger et al. ............ 709/203 |
| 5,764,906 A * | 6/1998 | Edelstein et al. ............ 709/219 |
| 5,774,660 A | 6/1998 | Brendel et al. |
| 5,813,007 A * | 9/1998 | Nielsen ............ 707/10 |
| 5,884,038 A * | 3/1999 | Kapoor ............ 709/226 |
| 5,978,828 A * | 11/1999 | Greer et al. ............ 709/224 |
| 6,041,360 A * | 3/2000 | Himmel et al. ............ 709/245 |
| 6,154,811 A | 11/2000 | Srbljic et al. |
| 6,167,446 A | 12/2000 | Lister et al. |
| 6,324,585 B1 * | 11/2001 | Zhang et al. ............ 709/245 |
| 6,330,605 B1 | 12/2001 | Christensen et al. |
| 6,389,462 B1 | 5/2002 | Cohen et al. |
| 6,728,712 B1 * | 4/2004 | Kelley et al. ............ 707/10 |
| 6,795,434 B1 * | 9/2004 | Kumar et al. ............ 370/392 |
| 6,871,346 B1 * | 3/2005 | Kumbalimutt et al. ....... 718/104 |
| 2001/0044825 A1 * | 11/2001 | Barritz ............ 709/203 |
| 2002/0052889 A1 * | 5/2002 | Shinoda ............ 707/500 |
| 2002/0065941 A1 * | 5/2002 | Kaan et al. ............ 709/249 |
| 2002/0103931 A1 * | 8/2002 | Mott ............ 709/245 |
| 2002/0116411 A1 * | 8/2002 | Peters et al. ............ 707/501.1 |
| 2003/0009656 A1 * | 1/2003 | Yamamura ............ 713/1 |
| 2003/0061278 A1 * | 3/2003 | Agarwalla et al. ............ 709/203 |
| 2003/0112792 A1 * | 6/2003 | Cranor et al. ............ 370/352 |
| 2004/0215823 A1 | 10/2004 | Kleinfelter et al. |
| 2004/0268056 A1 | 12/2004 | Landin et al. |
| 2005/0005027 A1 | 1/2005 | Drouet et al. |
| 2005/0216569 A1 * | 9/2005 | Coppola et al. ............ 709/213 |
| 2006/0036761 A1 * | 2/2006 | Amra et al. ............ 709/238 |
| 2007/0091879 A1 * | 4/2007 | Croak et al. ............ 370/356 |
| 2007/0124664 A1 * | 5/2007 | Clinton et al. ............ 715/501.1 |
| 2007/0266031 A1 * | 11/2007 | Adams et al. ............ 707/10 |
| 2008/0189248 A1 * | 8/2008 | Chung ............ 707/3 |
| 2008/0288609 A1 * | 11/2008 | Pramberger ............ 709/217 |

OTHER PUBLICATIONS http://www.irs.gov, archive of Apr. 3, 2004.*
Microsoft Windows XP 2003 SP2 screen captures.*

* cited by examiner

*Primary Examiner* — Jungwon Chang
(74) *Attorney, Agent, or Firm* — Park, Vaughan, Fleming & Dowler LLP

(57) ABSTRACT

A system for client caching of target addresses for network requests includes one or more processors and memory coupled to the processors, where the memory stores instructions executable by the processors to implement an application configured to direct network requests received from users to target servers over the network. The application attempts to update a current version of a local data object storing network addresses, where the attempt includes sending an update request to a redirecting server over a network. If the attempt succeeds, the application accesses the updated version of the local data object to obtain a target address for a network request. If the attempt fails, the target address is obtained from the version of the local data object that existed before the update was attempted. The application directs the network request to the appropriate server using the target address.

22 Claims, 6 Drawing Sheets

CLIENT CACHING OF TARGET ADDRESSES FOR NETWORK REQUESTS

BACKGROUND

In recent years, more and more business transactions are being conducted over the Internet. In many cases, a transaction may involve the submission of data from a client device to a target server. A user at the client device may interact with a client-side application, for example, and the client application may be configured to transmit the data submitted or identified by the user to the target server, without necessarily requiring the user to know or to provide an address (such as a Uniform Resource Locator or URL) of the target server. In one example scenario, a taxpayer may provide tax-related data (e.g., by typing in some or all of the data, or by providing pointers to other sources such as locally stored files or investment web sites from which the tax data may be obtained) to a tax preparation software application installed at a client device such as a personal computer or laptop. The tax preparation software application may be configured to perform the necessary computations on the provided data, prepare one or more tax returns corresponding to the data, and submit the prepared tax return or returns to the appropriate targets (such as web servers maintained by one or more taxing jurisdictions) over a network from the client device.

The vendor of a client application may often have no control over the addresses of the target servers to which data is to be submitted from the client application. The address of a target may change from time to time, and the organization responsible for the target (such as a government agency) may be under no obligation to implement any automated redirection mechanisms to ensure that data transmitted to the original (unchanged) target address is reliably received at the changed target address. Such changes may at least potentially result in a failure when the client application submits the data. The address change may occur after the client application is installed at the client computer system, so that, for example, a target address of a tax authority that is hard-coded in a client-side tax preparation application may be rendered invalid for use by the time the taxpayer is ready to file one or more tax returns. If a data submission on behalf of a user fails, the user's confidence level in the client application may fall, and the likelihood of the user re-purchasing products from the vendor responsible for the client application may be lowered. In addition, in some cases, a failed data submission may require the user to redo a non-trivial amount of work (e.g., by re-entering data in a form) to accomplish the task being performed.

SUMMARY

Various embodiments of methods and systems for client caching of target addresses for network requests are disclosed. According to one embodiment, a system includes one or more processors and memory coupled to the processors, where the memory stores program instructions executable by the processors to implement an application that may be configured to receive network requests (i.e., requests for services provided over a network) from one or more users and direct the requests to a target server or servers over the network. To direct the requests to the appropriate target server, the application may be configured to use a local data object comprising network address information for the target servers. In one embodiment, the application may be configured to attempt to update a current version of the local data object (e.g., when a user's network request is received and/or based on other triggering conditions), where the attempt includes sending an update request to a server over a network. The server to which the update request is sent may be termed a "redirecting server" herein, since its functions may include providing updated network addresses of the target servers to the application for use in directing the user network requests. The local data object may be implemented using a variety of techniques in different embodiments; for example, in one embodiment, the local data object may be organized as an initialization file containing one or more (attribute, value) pairs for the application, where the attribute names indicate services accessible via the network and the attribute values comprise network addresses from which the corresponding service may be obtained.

If the update attempt succeeds, e.g., if the application receives a valid response to the update request within a predetermined time interval, and if the local data object is successfully updated as a result, the application may be configured to access the updated version of the local data object to obtain a target network address for a network request. In general, under normal operating conditions, update attempts made by the application may have a high probability of success. However, under some circumstances the update attempt may fail: for example, because the redirecting server is temporarily unavailable, because connectivity to the redirecting server is lost, and/or because excessive network congestion results in an unacceptable delay in receiving a response to the update request. If the update attempt fails, the application may be configured to access the current version of the local data object (i.e., the version that existed before the update was attempted) to obtain a target network address for the network request. The attempted update may be transparent to the user that initiated the network request in some embodiments— e.g., the user may not be aware that an attempt to update a network address for the request has been made, and may therefore not be made aware of the failure or success of the update attempt. Having obtained the target network address, either from the updated version or the current version of the local data object, the application may direct the network request to the appropriate server using the target network address, e.g., by invoking browser functionality to access the target server corresponding to the target network address. The local data object may thus serve as a cache of network addresses to be used by the application in processing network requests, and may help to reduce the extent to which the application has to rely on the redirecting server to process the network requests.

In one exemplary embodiment, the application may comprise a tax return preparation tool, and the network requests may include submissions of tax return information. The target servers may implement web sites managed by tax authorities or government agencies, and the tax authorities or agencies may change the network addresses of target servers from time to time. In such a scenario, the software vendor responsible for the application may maintain the redirecting server as the source from which the correct target addresses for tax return submissions are to be obtained by instances of the tax return preparation tools, which may be installed at thousands of client devices.

In some embodiments, the response received from the redirecting server to an update request sent by the application may include one or more updated target server addresses, and the application may selectively replace only the changed portions of the local data object. In other embodiments, an up-to-date version of the complete local data object may be received, and if necessary, the old version may be replaced. It is noted that the up-to-date version may not necessarily include changed network addresses: e.g., in some cases the "old" version of the local data object may already include all the latest addresses, and the response to the update request may simply serve as a confirmation that the local data object is already up-to-date. In some embodiments, a customized web browser may be invoked by the application to direct the network request using the target server address obtained from the local data object. In one embodiment, the application may provide an interface (such as a toggle interface with a plurality of settings) to enable or disable future attempts to automatically update the local data object. In one embodiment, the application may be configured to use an updated network address to direct or transmit a network request before the current version of the local data object is updated; e.g., the network request may be transmitted to a target server as soon as the correct network address for the target server is obtained, without waiting for the local data object's update to be completed.

Figure 1:
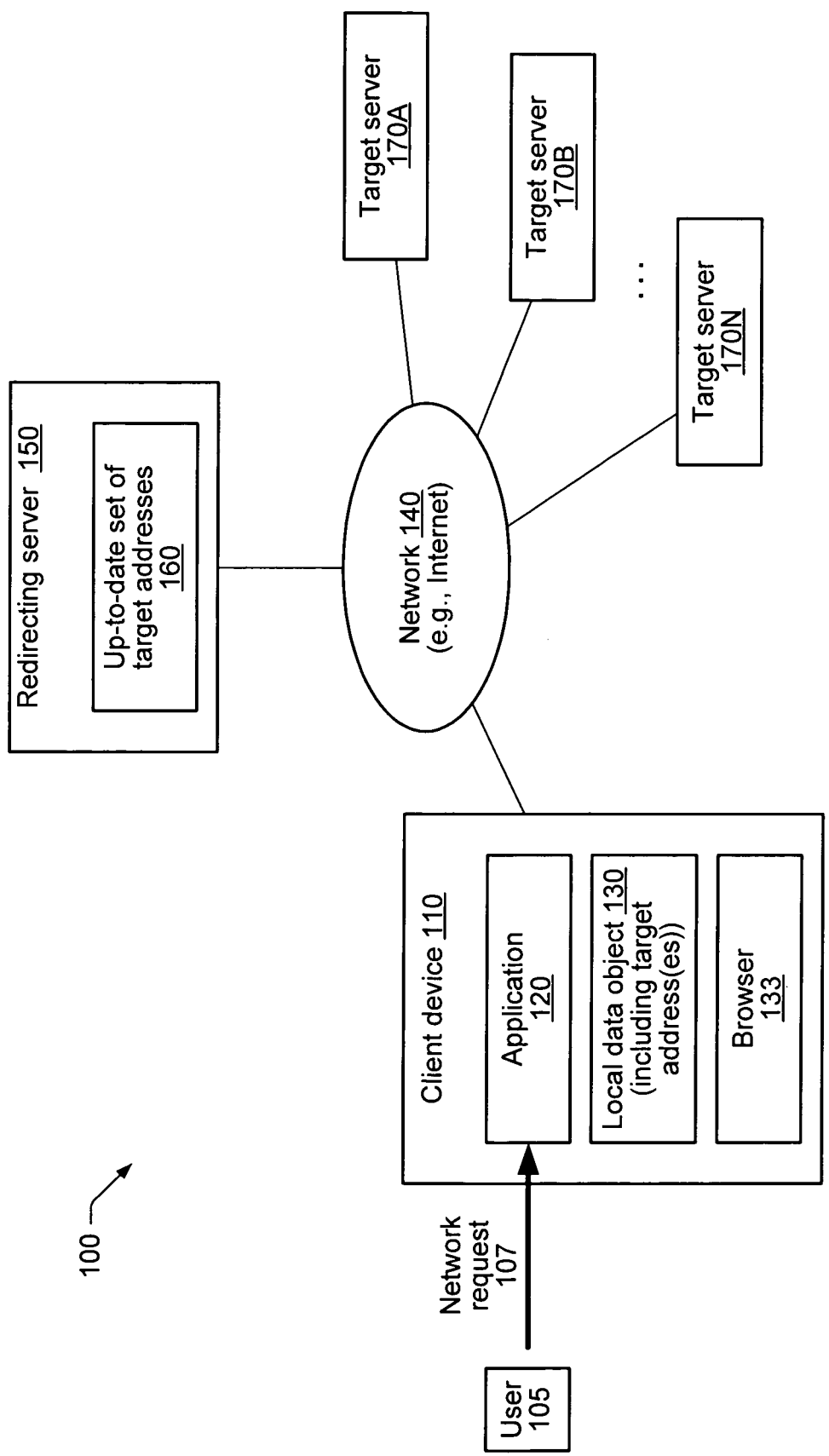
FIG. 1 is a block diagram illustrating one embodiment of a system.

While the invention is susceptible to various modifications and alternative forms, specific embodiments are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the spirit and scope of the present invention as defined by the appended claims.

DETAILED DESCRIPTION OF EMBODIMENTS

A user's computer system may be configured to cache one or more target addresses for network requests. An application running on the computer system may direct a network request to a target server over a network, such as the Internet. Before sending the network request, the application may attempt to update a current version of a local data object or cache storing one or more network addresses. The update attempt may include sending an update request to a redirecting update server. If the update attempt succeeds, the application accesses the updated version of the local data object to obtain a target address for the network request. If the attempt fails, the target address is obtained from the version of the local data object that existed before the update was attempted. The application then directs the network request to the appropriate server using the target address.

FIG. 1 is a block diagram illustrating one embodiment of a system 100. The system includes a client device 110 (e.g., a personal computer, laptop, PDA, cell phone, or other computing device) linked via a network 140 to one or more target servers 170 (e.g., target servers 170A-170N) and a redirecting server 150. An application 120 at the client device 110 may be configured to receive network requests, such as network request 107, from one or more users 105. The network request 107 may be for a service provided by one or more of the target servers 170, which may involve submitting data to a target server, receiving data from a target server, or both submitting and receiving data. The correct network address of the appropriate target server may not be known to the user 105 making the request 107, or may not have been provided by the user 105 to application 120 in some embodiments. The application 120 may be configured to determine the target network address to which the network request 107 should be directed in such embodiments. The application 120 may have access to a local data object 130 at the client device 110, such as a file stored on a file system, that includes versions of one or more network addresses, e.g., versions corresponding to the latest known addresses of target servers 170 from the perspective of the client device 110. The application 120 may be configured to attempt to update the current version of local data object 130, e.g., by sending an update request to the redirecting server 150 over network 140 in response to receiving a network request 107. The attempt to update the local data object 130 may be made, for example, because the redirecting server 150 may have access to the most recent or up-to-date set of addresses 160 for target servers 170, and some of the addresses may have changed since the client device 110 received or last updated the target addresses stored in local data object 130.

In one exemplary embodiment, application 120 may comprise a tax return preparation tool, requests 107 may include submissions of tax return information, target servers 170 may be managed by tax authorities or government agencies, and the tax authorities or agencies may change the network addresses of target servers from time to time. In such a scenario, the software vendor providing the application 120 may maintain redirecting server 150 as the source from which the correct target addresses for tax return submissions are to be obtained by instances of the tax return preparation tools, which may be installed at numerous (e.g., thousands or tens of thousands of) client devices 110.

When the number of client devices 110 supported by a redirecting server 150 is large, and especially when tax return filing deadlines approach, the load on the redirecting server 150 (or the network links required to access the redirecting server 150) may increase substantially, increasing the possibility that the redirecting server 150 or connectivity to the redirecting server may fail. Any suitable manual or automated techniques may be employed by the software vendor to ensure that the redirecting server 150 has the correct network addresses for target servers 170: e.g., an administrator or employee(s) of the software vendor may be responsible for determining if and when the network addresses of tax authorities change and updating the set of addresses 160, and/or the redirecting server 150 may be configured to subscribe to a service providing notifications of target server address changes.

It is noted that the redirecting server 150 may be configured to provide a number of additional services to applications 120 in addition to providing target server addresses—e.g., in one embodiment the redirecting server 150 may also be maintained by the software vendor responsible for application 120 to provide bug fixes, product updates and the like. In addition to being triggered by network requests 107, an update of local data object 130 may also be triggered by a variety of other conditions in different embodiments—for example, in one embodiment, updates may be attempted at predetermined intervals such as once a day, while in another embodiment, local data objects 130 may be updated when the application 120 connects to the redirecting server for other purposes such as to receive bug fixes or product updates. In one embodiment, only requests 107 of a particular type (e.g., submissions of tax return information to a tax authority) may trigger attempts to update the local data object, while other types of requests (such as queries or searches) may not lead to update attempts. In some embodiments, as in the tax return example above, the target servers 170 may be owned and/or managed by a different entity than redirecting server 150 and/or client device 110; in other embodiments, the target servers 170 may be owned or managed by the same organization that owns or manages redirecting server 150 or client device 110.

In some embodiments, under normal operating conditions, an attempt to update the local data object 130 may have a high probability of success—e.g., typically, the redirecting server 150 may be expected to be operational and the network path between the client device 130 and the redirecting server 150 may also be expected to be functioning correctly. If the attempt to update succeeds, the application 120 may be configured to access the updated version of the local data object 130 to obtain a target network address for the request 107. In one implementation, if the response provided by the redirecting server 150 to the update request indicates that the current version of the local data object 130 at the client device 130 is already up-to-date, the local data object may not be physically updated; in other implementations, the current version of the local data object 130 may be physically updated even if it already included the most recent address information provided by the redirecting server. Thus, in some cases the updated version of the local data object may have the same contents as the version before the update is applied: e.g., the target network address information sent by the redirecting server may be the same as the target network address information contained in the current version of the local data object 130, and the update may simply have the effect of confirming that the address information stored locally at the client device 130 is still correct.

In some implementations, version numbers or other version indicators may be maintained for target addresses (or for the entire local data object 130) by the application 120 and/or the redirecting server 150. In one such implementation, the update request sent by the application 120 may include an indicator or indicators of the latest versions of the target addresses stored in the local data object 130. On receiving the update request, the redirecting server 150 may determine, e.g., using the version indicators, whether the local data object at the client device 110 has stale addresses that need to be replaced by different addresses, or whether the current version of the local data object 130 is already up-to-date. If the redirecting server 150 determines that the current version of the local data object 130 is already up-to-date, the redirecting server may simply send an indication to the application 120 that no updated address information is available. In other embodiments, the redirecting server may be configured to send the latest available target server addresses 160 to the application 120, e.g., without determining whether the current version of the local data object is already up-to-date or not.

Under certain circumstances, the attempt to update the local data object 130 may fail—e.g., the redirecting server 150 may be down at the time the attempt is made, network connectivity to the redirecting server may be temporarily unavailable, or excessive network congestion may have resulted in an unacceptable delay in receiving a response to the update request. If the attempt fails, or if no updated address information is provided by the redirecting server, the application 120 may be configured to access the current version of the local data object 130 to obtain the target network address for the network request.

The attempted update may be transparent to the user 105 in some embodiments—e.g., the user may not be aware that an attempt to update a network address for request 107 has been made, and may therefore not be made aware of the failure or success of the update attempt. Having obtained the target network address, either from the updated version of the local data object 130 or from the version that existed prior to the attempted update, the application 120 may direct the network request 107 to the appropriate target server 170. For example, in one embodiment, the application 120 may be configured to invoke browser 133 functionality to send content submitted by user 105 to the target server 170 corresponding to the target network address. Any desired networking protocol or combination of protocols, such as HTTP (Hyper Text Transfer Protocol), HTTPs (HTTP over Secure Sockets Layer), FTP (File Transfer Protocol), TCP/IP (Transmission Control Protocol/Internet Protocol) (which may be used by higher-level protocols like HTTP, HTTPs and FTP) may be used to transmit or receive data for the request 107 by application 120 and/or browser 133.

It is noted that application 120 may not be able to guarantee that the target network address that is used for a network request 107 is the correct one in some embodiments; e.g., it may be possible that despite the best efforts of the application 120 to obtain the latest address information, an out-of-date or incorrect target address is used. If an error (such as a "server not found" error or the equivalent) is received in response to directing the network request 107, the application 120 may be configured to respond using any of a number of different techniques in different embodiments: e.g., the error may be logged locally at the client device 110 and a record of the error may be sent to the redirecting server 150 (either immediately or after connectivity has been restored, depending on the state of communications with the redirecting server), or the request 107 may be retried after a delay.

The updated version of the local data object 130 may be retained for potential use for subsequent network requests 107, in effect serving as a client-side cache of target server addresses. In some embodiments, the update of the local data object 130 may result in new target addresses being stored at client 130 for a number of different types of network requests 107 or even for different applications 120. For example, in one embodiment, an update attempt triggered by a request 107 to submit tax return information for a particular taxing authority (such as a national or federal tax authority) may result in the local data object 130 being updated with new target server addresses for other taxing authorities (such as state tax authorities or municipal tax authorities), or for other services. The use of client-side caching techniques for storing network addresses for a number of different services may help to reduce the extent to which applications 120 have to rely on the availability of access to redirecting server 150. Since a given request 107 may result in refreshing the cache with the latest addresses for several different services, the overall probability that the correct network address for any particular service is already present at the client device 110 may increase, thus reducing the impact of a failed update attempt. In some embodiments, redirecting server 150 may be implemented as a highly available collection of devices (such as a cluster of servers), further increasing the probability that attempts to update the local data objects 130 from various client devices 110 succeed.

Figure 2:
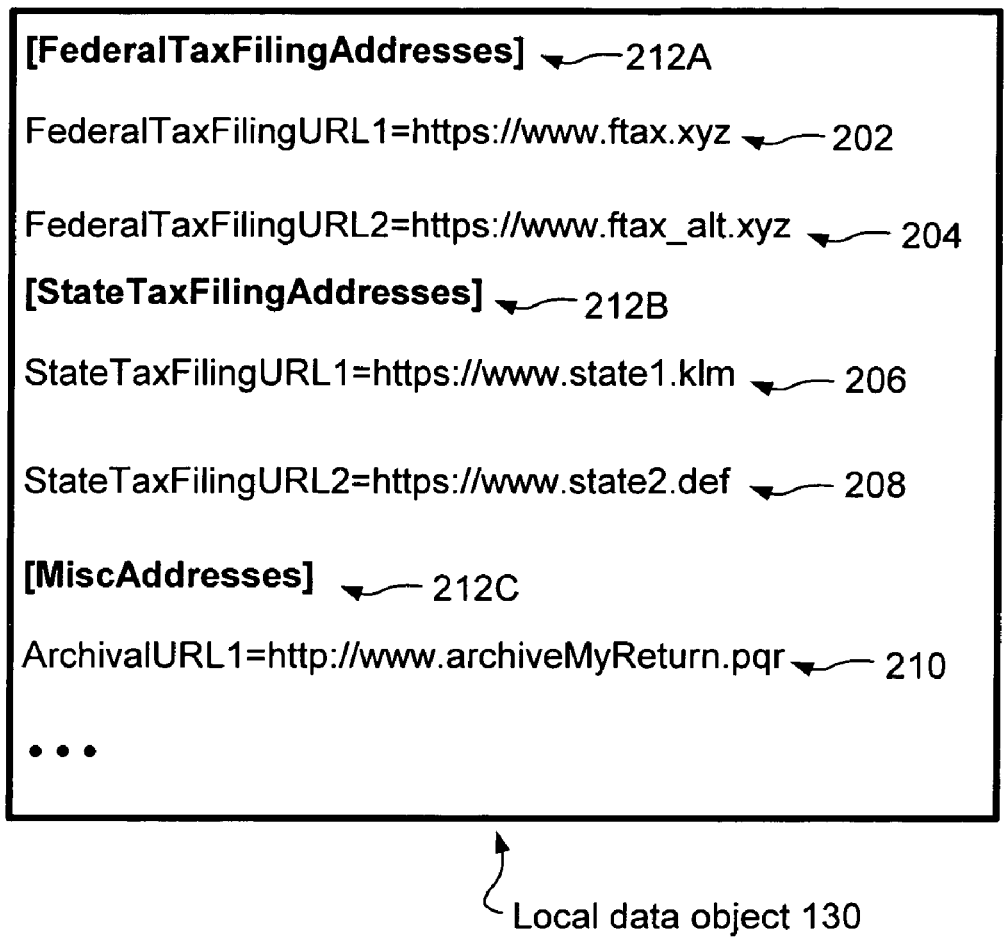
FIG. 2 illustrates an example of a local data object organized as an initialization or INI file for an application, according to one embodiment.

The local data object 130 may store target addresses in any desired format. For example, in one embodiment the local data object 130 may have a format similar to that of the initialization files (also referred to herein as "INI" or ".ini" files based on the file name extension for the initialization files) used in operating systems such as various versions of Microsoft Windows™ and by applications 120 running on such operating systems. For example, the local data object 130 may have a format similar to that of the "boot.ini" file used to control aspects of system boot operations in some Windows™ operating systems. In one implementation, an INI file may be organized as one or more sections, with each section comprising a section header and one or more (attribute=value) clauses. FIG. 2 illustrates an example of a local data object 130 organized as an initialization or INI file for application 120, according to one embodiment. As shown, the local data object 130 comprises sections identified by section headers 212A ("FederalTaxFilingAddresses"), 212B ("StateTaxFilingAddresses") and 212C ("MiscAddresses"). The section associated with header 212A includes (attribute=value) pairs 202 and 204, where the attribute of a given (attribute=value) pair indicates a name or key that may be used to represent a service, and the value represents a network address (a Uniform Resource Locator or URL) from which the corresponding service may be obtained. Thus, the "FederalTaxFilingURL1" attribute has the associated value or address "https://www.ftax.xyz" and the "FederalTaxFilingURL2" attribute has the associated address "https://www.ftax_alt.xyz". For example, the FederalTaxFilingURL1 and FederalTaxFilingURL2 values may indicate a pair of alternate addresses, either one of which may be used to submit federal tax returns. Similarly, in the section associated with header "StateTaxFilingAddresses" 212B of the example INI file illustrated in FIG. 2, (attribute=value) pairs 204 and 206 may indicate network addresses for filing state tax returns, while in the section associated with header "MiscAddresses", (attribute=value) pair 208 may indicate a network address for an archival server where tax returns may be archived. In embodiments where the local data object 130 includes a plurality of network addresses, the application 120 may be configured to determine which specific address is to be used for the current request 107 based on the nature of the request 107 and/or on attribute name information corresponding to the addresses. In some embodiments, as in the embodiment illustrated in FIG. 2, the network addresses may be stored as URLs, while in other embodiments other formats for network addresses may be used, such as IP (Internet Protocol) addresses and port numbers. The addresses may indicate the networking protocol to be used in some implementations: e.g., http (Hyper Text Transfer Protocol), https (Hyper Text Transfer Protocol over SSL (Secure Sockets Layer)), or any other desired protocol may be specified.

It is noted that section headers 212 may be omitted in some implementations; e.g., local data object 130 may simply comprise a list of (attribute=value) pairs without separately delineated sections. In one implementation, a number of alternate values may be listed for a given attribute: e.g., instead of (attribute=value) pairs, the contents of the local data object may be listed as (attribute=value1, value2, . . . valueN). In other embodiments, local data object 130 may be implemented without using text-format attribute information of the kind illustrated in FIG. 2. For example, in some embodiments local data object 130 may be stored as a binary, encoded, or encrypted file rather than a clear-text file. In some embodiments, information other than network addresses may be included within the local data object 130, such as various parameters controlling the operation of application 120 and/or licensing-related data. In some embodiments, a version number, a time of applicability field, and/or a "last modified time" field may be included within the local data object 130, which may allow application 120 to determine whether it has received a newer version of the latest local data object contents that it previously had. In some implementations, each (attribute=value) pair may have its own associated versioning or "last modified time" information. In one implementation, network addresses for target servers may be stored in formats other than (attribute=value) pairs; e.g., just a set of one or more network addresses may be stored, and the relative order of the different addresses may be used to interpret the addresses (e.g., the first address may correspond to a federal tax filing address, the second to a state tax filing address, and so on). Only a single network address may be stored in the local data object in some embodiments.

As noted earlier, the application 120 may send an update request to redirecting server 150 to obtain the most recent target network addresses available. In some embodiments, the response from the redirecting server 150 may comprise a new version of a subset of the data included within local data object 130. For example, if the current version of the local data object includes the information shown in the example illustrated in FIG. 2, the redirecting server 150 may respond to the update request with a message comprising an updated value for FederalTaxFilingURL1, but may not contain values for other attributes. One such message may include the following text: "FederalTaxFilingURL1.updatedValue=https://www.fedtax.abc". On receiving such a message, the application 120 may in one embodiment parse the contents of the message and replace the value of the updated attribute in the local data object 130 to the new value included in the message, while leaving other attribute values in the local data object unchanged. In other embodiments, instead of sending individual attribute values or subsets of the content of the local data object 130, the redirecting server may simply send an updated version of the entire data object, even if some portions of the object have not been changed from the last time that the object was provided to the application 120 or from the time that the local data object was first created at the client device 110. On receiving the new version of the data object, the application 120 may replace the old version with the new version. In some embodiments, the old version may be saved or archived at the client device 110, e.g., as a precaution in case the new version happens to be corrupted.

Figure 3:
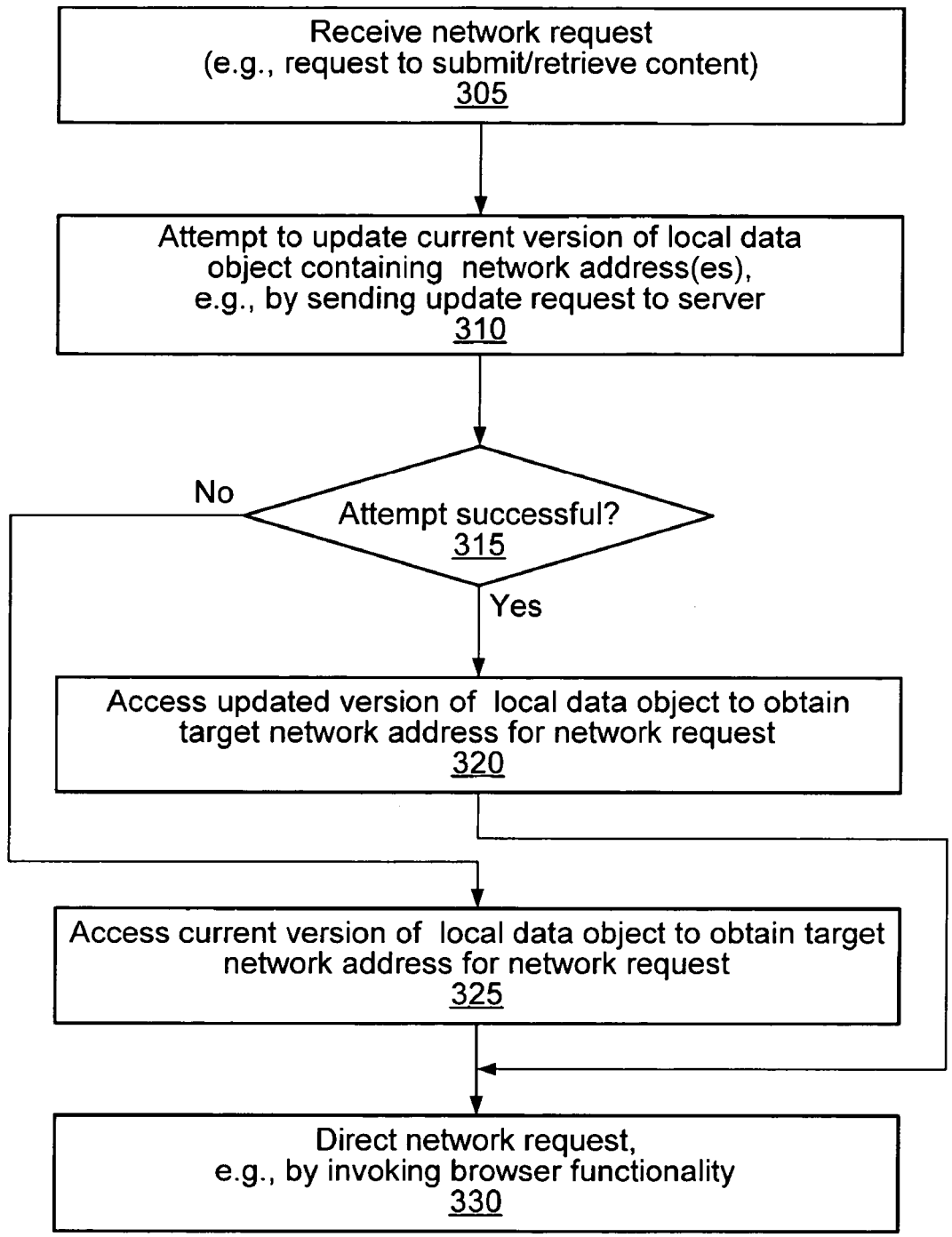
FIG. 3 is a flow diagram illustrating aspects of the operation of an application, according to one embodiment.

FIG. 3 is a flow diagram illustrating aspects of the operation of application 120, according to one embodiment. As shown in block 305, the application 120 may receive a network request 107, such as a request to submit content (and/or retrieve content) over network 140. The application 120 may be configured to attempt to update a current version of a local data object that comprises one or more network addresses (block 310); the attempt may include sending an update request to a redirecting server 150 over a network 140. If the update attempt succeeds (as detected in block 315), e.g. if a response in an expected format is received from the redirecting server within an acceptable time interval, the application 120 may be configured to access the updated version of the local data object to obtain a target network address for the network request 107 (block 320). If the update attempt fails (as also detected in block 315), the application 120 may be configured to access the current version (i.e., the version that was present before the update attempt was made) of the local data object 130 to obtain the target network address (block 325). The update attempt may fail for a variety of reasons in different embodiments, e.g., if network connectivity to the redirecting server is lost, if congestion in the network results in sufficient delays that a timeout threshold is exceeded before the response from the redirecting server is received, or if the redirecting server happens to be unavailable. After the target network address is obtained, either from the current, un-updated version or from the updated version of the local data object 130, the network request 107 may be directed to the appropriate target server 170 (block 330). For example, browser functionality 133 at the client device 110 may be invoked by application 120 to transmit or receive data in accordance with the network request 107 using the target network address. In some embodiments, a default or standard version of a web browser (such as the Internet Explorer browser from Microsoft Corporation, or the Mozilla Firefox browser from www.mozilla.com) may be used for the network request 107; in other embodiments, a browser customized for the application 120 may be used. A browser may be customized in various ways to support the functionality needed by application 120: e.g., one or more plug-in modules may be included in the browser executable code, and/or the browser functionality may be invoked using application programming interface (API) calls from the application 120 without requiring a display of a traditional browsing window. In some embodiments, the network request 107 may be processed without using browser functionality, e.g., the application 120 may itself be configured to communicate with target servers 170 on behalf of user 105.

Figure 4:
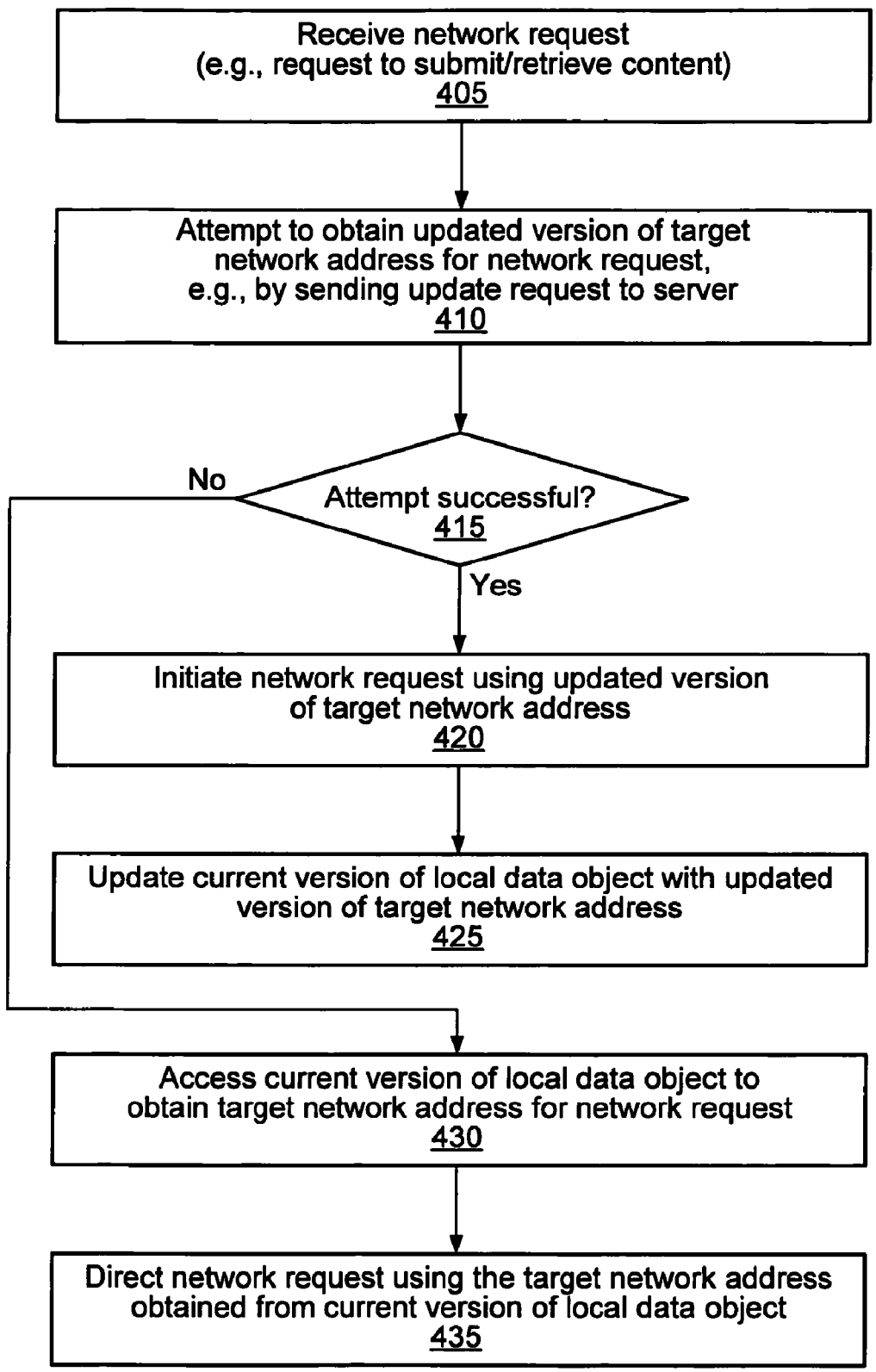
FIG. 4 is a flow diagram illustrating aspects of the operation of an application according to an embodiment in which the application is configured to use address information received from a redirecting server to direct a network request before a local data object is updated with the address information.

In one embodiment, instead of updating the current version of the local data object 130 and then obtaining the target network address from the updated local data object, the application 120 may be configured to use address information received from redirecting server 150 to direct or transmit the network request 107 before the local data object is updated. FIG. 4 is a flow diagram illustrating aspects of the operation of the application 120 according to one such embodiment. When network request 107 is received (block 405), the application 120 may be configured to attempt to obtain an updated target network address for the request 107 (block 410), e.g., by sending an update request to a redirecting server 150. If the attempt succeeds (as detected in block 415), e.g., if the redirecting server 150 sends an updated target address to the application 120 and the application successfully receives the updated address, the application 120 may be configured to direct the network request 107 using the updated address (block 420). After the network request has been directed, e.g., by invoking browser functionality 133 or by the application 120 directly communicating with the appropriate target server 170, the current version of the local data object 130 may be updated to reflect the updated target address (block 425). (As noted earlier, in some scenarios the updated target address may not differ from the address already available in the local data object 130; in some embodiments, the local data object 130 may not be updated if this is the case.) Thus the update of the local data object 130 may be decoupled from the use of an updated address for a currently pending network request in such embodiments. If the attempt to obtain the updated target address is unsuccessful (as also determined in block 415), e.g., if a response to the update request is not received by the application within a predetermined timeout period, the application 120 may be configured to retrieve the target network address from the current version of the local data object 130 (block 430), and direct the network request using the target address retrieved from the current version (block 435). In some embodiments, the application 120 may be configured to receive an indication of success for the network request 107 before the local data object 130 is updated in operations corresponding to block 425—e.g., the application may delay updating the local data object until a confirmation or acknowledgement is received from the target server 170 corresponding to the target network address that was used.

Figure 5:
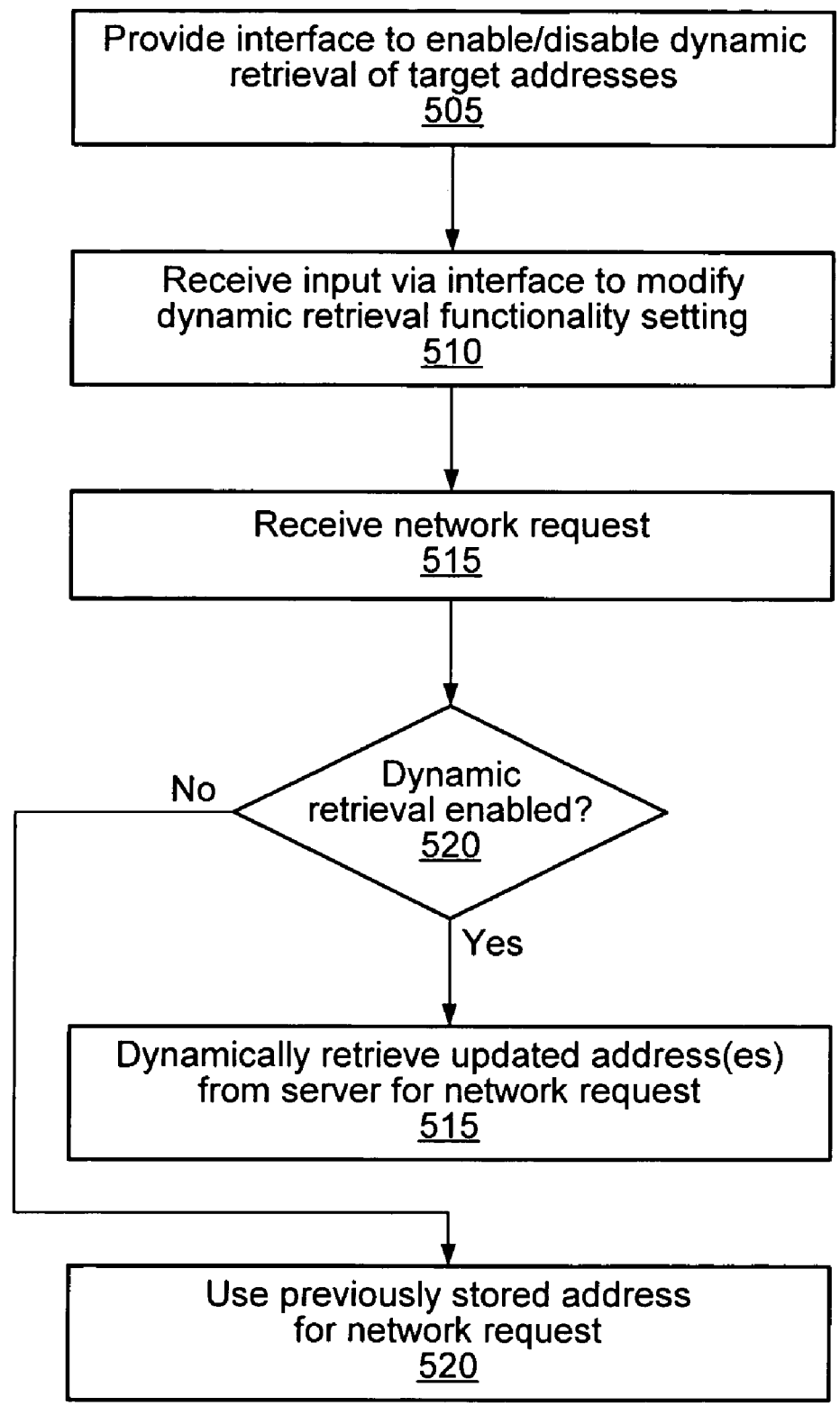
FIG. 5 is a flow diagram illustrating aspects of the operation of an application in an embodiment where users or administrators may be permitted to enable or disable the application's functionality of retrieving updates from the redirecting server.

FIG. 5 is a flow diagram illustrating aspects of the operation of application 110 in an embodiment where users or administrators may be permitted to enable or disable the application's functionality of retrieving updates from the redirecting server 150. As shown in block 505, in the depicted embodiment the application 120 may provide an interface to enable and/or disable dynamic retrieval of target addresses. Any of a variety of different types of interfaces may be provided in various embodiments, such as a toggle interface, a graphical interface to set preferences or properties associated with application 120, or a configuration parameter file for application 120. In one embodiment, for example, a toggle interface may support a plurality of settings. A first setting may indicate that the application 120 is to attempt to update the current version of the local data object for each subsequent network request. A different setting may indicate that the application is not to attempt to update the current version of the local data object for each subsequent network request. The application 120 may receive input via the interface to modify the current update retrieval functionality setting: e.g., to disable further update attempts if the current setting enables update attempts for each network request, or to enable further update attempts if the current setting disables updates (block 510). When the next network request 107 is received by the application 120 (block 515), the new settings may govern the actions taken by the application 120. If dynamic retrieval of updated addresses is enabled (as detected in block 520), the application may attempt to obtain updated address information from the redirecting server for the network request (block 515); in contrast, if dynamic retrieval of updated addresses is disabled (as also detected in block 520), the application 120 may use a previously stored address (e.g., in the current version of the local data object 130) for the network request. A user or administrator may wish to temporarily or permanently suspend attempts to update target address information, for example, if the user is aware of a failure of the redirecting server 150 or of a lack of network access to the redirecting server 150. In some embodiments, the dynamic update capability of the application may be disabled in response to a communication from the redirecting server 150: e.g., the redirecting server 150 (or an employee of an organization owning or managing redirecting server 150) may have obtained information that no further changes are to be made to target server 170 addresses for a specified period, and may therefore wish to reduce the unnecessary network traffic that may result from attempts to update the addresses. In some embodiments, e.g., where the application 120 may be configured to attempt to update target address information at specified intervals, the application 120 may be configured to modify the frequency of the attempts based on one or more factors. For example, if the application 120 comprises a tax return preparation tool, as the deadline for filing tax returns for a particular financial year approaches, the application 120 may be configured to increase the frequency with which it checks for updated addresses from weekly to daily.

Figure 6:
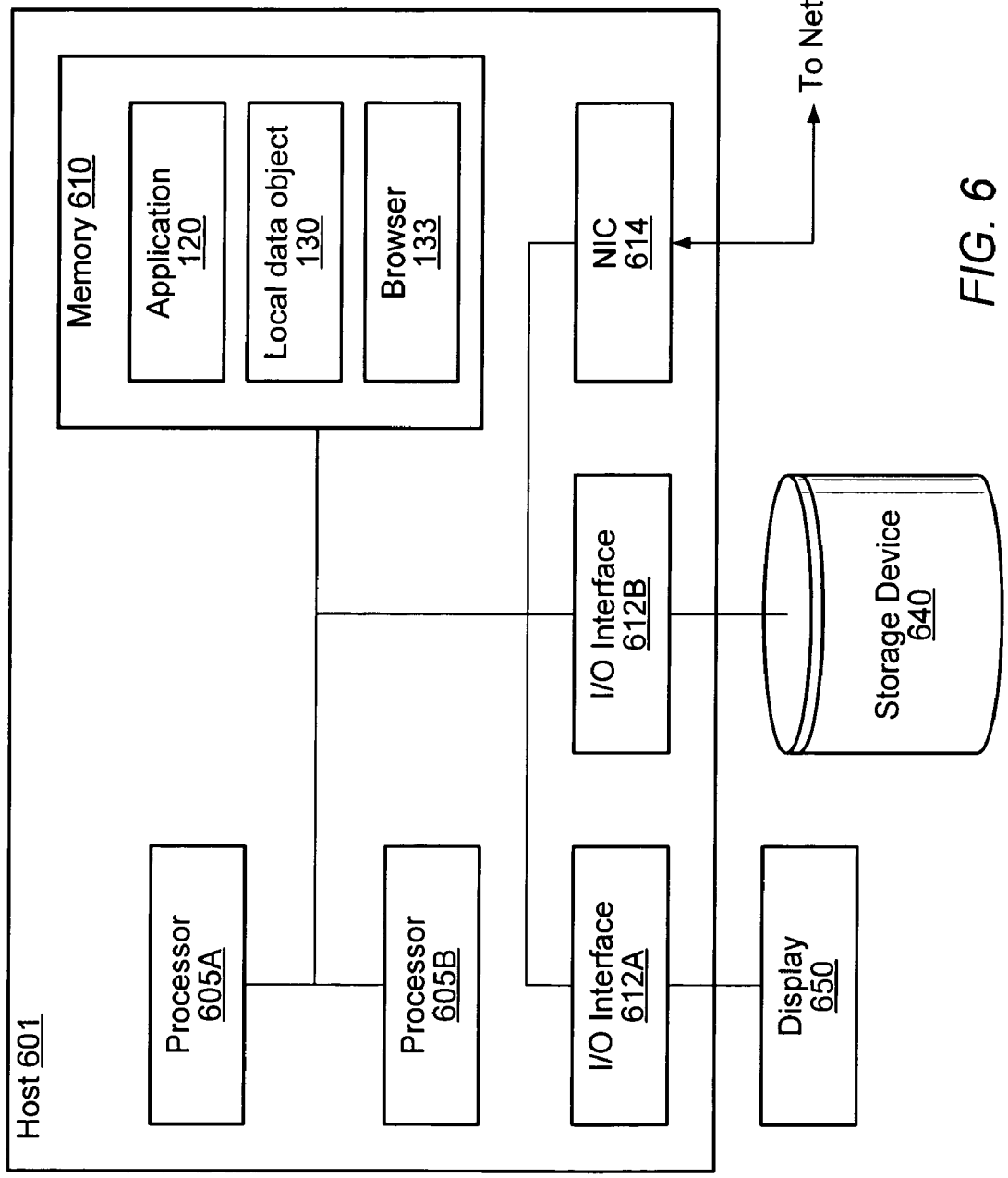
FIG. 6 is a block diagram illustrating constituent elements of a computer host, according to one embodiment.

FIG. 6 is a block diagram illustrating constituent elements of a computer host 601 at which at least a portion of application 120 may be executed, according to one embodiment. Hosts similar to host 601 may also be utilized for redirecting server 150 and/or target servers 170 in some embodiments.

Host 601 may include one or more processors 605 implemented using any desired architecture or chip set, such as the SPARC™ architecture, an x86-compatible architecture from Intel Corporation, Advanced Micro Devices, or an other architecture or chip set capable of processing data. Any desired operating system may be run on the host 605, such as various versions of Unix, Linux, Windows™ from Microsoft Corporation, MacOS from Apple Corporation, or any other operating system that enables the operation of software on a hardware platform. Program instructions that may be executable to implement the functionality of application 120 and browser 133 may be partly or fully resident within a memory 610 at the host 601 at any given point in time, and may also be stored on a storage device 640 such as a disk or disk array accessible from the processors. Local data object 130 may also be stored within memory 610 and/or storage devices 640. In various embodiments, application 120 may be packaged as a standalone application, or may be packaged along with a suite of other software applications or tools. The memory 610 used to store the program instructions may be implemented using any appropriate medium such as any of various types of RAM (e.g., DRAM, SDRAM, RDRAM, or SRAM). In addition to processors and memory, the host 601 may also include one or more I/O interfaces 612 (such as I/O interface 612A providing access to a display 650 and I/O interface 612B providing access to storage devices 640), and one or more network interfaces (such as network interface card (NIC) 614) providing access to network 140.

Any of a variety of storage devices 640 may be used to store the program instructions as well as application data in different embodiments, including any desired type of persistent and/or volatile storage devices, such as individual disks, disk arrays, optical devices such as CD-ROMs, CD-RW drives, DVD-ROMs, DVD-RW drives, flash memory devices, various types of RAM, holographic storage and the like. It should be noted that one or more components of host 601 may be located remotely and accessed via a network. In some embodiments, the functionality of application 120, redirecting server 150, and/or a target server 170 may be distributed across multiple computer hosts, e.g., in a cluster configuration. A mobile computing device such as a personal digital assistant (PDA) or an advanced mobile phone may incorporate some or all of the functionality of application 120 in one embodiment. Network 140 may include portions or all of a wired or wireless LAN (local area network), a WAN (wide area network), and/or portions of the Internet in various embodiments. Any desired networking technology (e.g., various versions of Ethernet, Token Ring, FDDI, Fibre channel, or any other technology suitable for linking computing devices) may be used to implement network 140 in various embodiments, and any of a variety of proprietary or standard networking protocols (e.g., TCP/IP, UDP/IP, or SNA) may be employed for communication over the network.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A client system, comprising:
    a processor;
    a memory coupled to the processor;
    a receiving mechanism configured to receive, from an application on the client system, a network request to access a target server associated with a target server name, wherein the target server name is indicated by a local data object stored in the client system; and
    a sending mechanism configured to send an update request to a redirecting server over a network for updating a current version of the local data object in response to the receiving mechanism receiving the request to access the target server, wherein the update request includes the target server name, and wherein the redirect server is different than the target server;
    wherein the receiving mechanism is further configured to receive, from the redirecting server, a message indicating an updated target uniform resource locator (URL) for an attribute value associated with the local data object; and
    wherein the client system further comprises:
        a parsing mechanism configured to parse the message to obtain the target URL for the network request;
        a replacing mechanism configured to replace the URL associated with the attribute value with the received target URL in the local data object at the client; and
        a directing mechanism configured to direct the network request using the target URL.

2. The system as recited in claim 1, wherein the directing mechanism is further configured to use Hyper Text Transfer Protocol (HTTP).

3. The system as recited in claim 1, wherein the network request comprises a submission of specified content.

4. The system as recited in claim 3, wherein the specified content comprises at least a portion of a representation of a tax return, and wherein the target URL for the network request includes an address of a tax authority.

5. The system as recited in claim 1, wherein the local data object is an initialization (INI) file for the application.

6. The system as recited in claim 1, wherein
    the receiving mechanism is further configured to receive a response from the server to the update request, wherein the response includes an updated version of a particular network address, and wherein the current version of the local data object comprises a previous version of the particular network address and a previous version of an other network address; and
    the replacing mechanism is further configured to replace the previous version of the particular network address in the local data object with the updated version, and retain the previous version of the other network address in the local data object.

7. The system as recited in claim 1, wherein the receiving mechanism is further configured to receive a response from the server to the update request, wherein the response includes an updated version of the local data object; and
    the replacing mechanism is further configured to replace the current version of the local data object with the updated version of the local data object.

8. The system as recited in claim 1, wherein while directing the network request the directing mechanism is further configured to invoke web browser functionality to send content submitted by a user to the target URL of the target server name.

9. The system as recited in claim 8, wherein the web browser functionality is implemented within a version of a web browser customized for the application to direct the network request using the target URL of the target server name obtained from the local data object.

10. The system as recited in claim 1, further comprising an interface mechanism configured to set a preference setting that indicates a preference for updating or not updating the current version of the local data object for an additional network request; and in response to the preference setting indicating a preference for not updating the current version of the local data object, the directing mechanism is further configured to direct the additional network request without attempting to update the current version of the local data object.

11. A non-transitory computer-readable storage medium, comprising program instructions, wherein the instructions are computer-executable to implement an application at a client system configured to:

receive, from the application at the client system, a network request to access a target server associated with a target server name, wherein the target server name is indicated by a local data object stored in the client system;

send an update request to a redirecting server over a network for updating a current version of the local data object in response to receiving the request to access the target server, wherein the update request includes the target server name, and wherein the redirect server is different than the target server;

receive from the redirecting server a message indicating an updated target uniform resource locator (URL) for an attribute value associated with the local data object;

parse the message to obtain the target URL for the network request;

replace the URL associated with the attribute value with the received target URL in the local data object at the client; and direct the network request using the target URL.

12. The non-transitory storage medium as recited in claim 11, wherein to direct the network request, the application is further configured to use Hyper Text Transfer Protocol (HTTP).

13. The non-transitory storage medium as recited in claim 11, wherein the network request comprises at least a portion of a representation of a tax return, and wherein the target URL for the network request includes an address of a tax authority.

14. The non-transitory storage medium as recited in claim 11, wherein the local data object includes an initialization (INI) file for the application.

15. The non-transitory storage medium as recited in claim 11, wherein to direct the network request, the application is further configured to invoke web browser functionality to send content submitted by a user to the target URL of the target server.

16. The non-transitory storage medium as recited in claim 11, wherein the application is further configured to:

set, through an interface, a preference setting that indicates a preference for updating or not updating the current version of the local data object for an additional network request; and in response to the preference setting indicating a preference for not updating the current version of the local data object, directing the additional network request without attempting to update the current version of the local data object.

17. A computer-implemented method at a client system, comprising:

receiving, from the application at the client system, a network request to access a target server associated with a target server name, wherein the target server name is indicated by a local data object stored in the client system;

sending an update request to a redirecting server over a network for updating a current version of the local data object in response to receiving the request to access the target server, wherein the update request includes the target server name, and wherein the redirect server is different than the target server;

receiving a message from the redirecting server indicating an updated target uniform resource locator (URL) for an attribute value associated with the local data object;

parsing the message to obtain the target URL for the network request;

replacing the URL associated with the attribute value with the received target URL in the local data object at the client; and directing the network request using the target URL.

18. The method as recited in claim 17, wherein the network request comprises a submission of specified content.

19. The method as recited in claim 17, wherein the network request comprises at least a portion of a representation of a tax return, and wherein the target URL for the network request includes an address of a tax authority.

20. The method as recited in claim 17, wherein the local data object includes an initialization (INI) file for the application.

21. The method as recited in claim 17, wherein said directing the network request comprises invoking web browser functionality to send content submitted by a user to the target URL of the target server name.

22. The method as recited in claim 17, further comprising:

setting, through an interface, a preference setting that indicates a preference for updating or not updating the current version of the local data object for an additional network request; and in response to the preference setting indicating a preference for not updating the current version of the local data object, directing the additional network request without attempting to update the current version of the local data object.

* * * * *